(12) United States Patent
Liang et al.

(10) Patent No.: US 8,892,625 B2
(45) Date of Patent: Nov. 18, 2014

(54) HIERARCHICALLY CLUSTERED P2P STREAMING SYSTEM

(75) Inventors: Chao Liang, Brooklyn, NY (US); Yang Guo, Plainsboro, NJ (US); Yong Liu, Brooklyn, NY (US)

(73) Assignee: Thomson Licensing, Issy les Moulineaux (FR)

( * ) Notice: Subject to any disclaimer, the term of this patent is extended or adjusted under 35 U.S.C. 154(b) by 406 days.

(21) Appl. No.: 12/450,212

(22) PCT Filed: Dec. 14, 2007

(86) PCT No.: PCT/US2007/025656
§ 371 (c)(1),
(2), (4) Date: Sep. 16, 2009

(87) PCT Pub. No.: WO2008/115221
PCT Pub. Date: Sep. 25, 2008

(65) Prior Publication Data
US 2010/0042668 A1    Feb. 18, 2010

Related U.S. Application Data

(60) Provisional application No. 60/919,035, filed on Mar. 20, 2007.

(51) Int. Cl.
*G06F 15/16* (2006.01)
(52) U.S. Cl.
USPC ............ 709/201; 709/202; 709/203; 709/221; 709/231
(58) Field of Classification Search
USPC .......................... 709/201, 202, 203, 231, 221
See application file for complete search history.

(56) References Cited

U.S. PATENT DOCUMENTS

| | | | |
|---|---|---|---|
| 5,319,743 A * | 6/1994 | Dutta et al. | 345/645 |
| 6,807,165 B2 | 10/2004 | Belcea | |
| 7,079,509 B2 | 7/2006 | Belcea | |
| 7,099,296 B2 | 8/2006 | Belcea | |
| 7,133,391 B2 | 11/2006 | Belcea | |
| 7,188,340 B2 * | 3/2007 | Ostertag et al. | 717/144 |
| 7,197,016 B2 | 3/2007 | Belcea | |

(Continued)

FOREIGN PATENT DOCUMENTS

| | | |
|---|---|---|
| EP | 1615403 | 1/2006 |
| JP | 2006025408 | 1/2006 |

(Continued)

OTHER PUBLICATIONS

Magharei et al.: "Understanding Mesh-Based Peer-to-Peer Streaming," NOSSDAV '06, Newport, Rhode Island, XP002444978.

(Continued)

*Primary Examiner* — Firmin Backer
*Assistant Examiner* — Jonathan Bui
(74) *Attorney, Agent, or Firm* — Robert D. Shedd; Kuniyuki Akiyama

(57) ABSTRACT

A HCPS (hierarchically clustered P2P streaming system) comprising peers grouped into clusters and hierarchies. The HCPS actively balances the uploading capabilities among clusters and executes an optimal scheduling algorithm within each cluster to ensure that system resources are optimally utilized. The HCPS comprises an architecture which can be used in practical applications, yet can achieve the streaming rate close to the theoretical upper bound.

8 Claims, 6 Drawing Sheets

(56) References Cited

U.S. PATENT DOCUMENTS

| | | | |
|---|---|---|---|
| 7,212,504 B2 | 5/2007 | Belcea | |
| 7,257,628 B2* | 8/2007 | Liskov et al. | 709/223 |
| 7,394,817 B2* | 7/2008 | Yap | 370/400 |
| 7,577,750 B2* | 8/2009 | Shen et al. | 709/231 |
| 7,593,333 B2 | 9/2009 | Li et al. | |
| 7,657,648 B2* | 2/2010 | Xiong et al. | 709/231 |
| 7,719,957 B2* | 5/2010 | Raahemi et al. | 370/217 |
| 7,809,850 B2 | 10/2010 | Shimizu et al. | |
| 7,818,407 B2* | 10/2010 | O'Neal et al. | 709/221 |
| 8,130,757 B2 | 3/2012 | Shimizu et al. | |
| 2002/0080750 A1 | 6/2002 | Belcea | |
| 2002/0085526 A1 | 7/2002 | Belcea | |
| 2002/0089945 A1 | 7/2002 | Belcea | |
| 2002/0150075 A1 | 10/2002 | Belcea | |
| 2002/0161898 A1 | 10/2002 | Hartop et al. | |
| 2003/0131044 A1* | 7/2003 | Nagendra et al. | 709/201 |
| 2003/0142638 A1 | 7/2003 | Belcea | |
| 2003/0142645 A1 | 7/2003 | Belcea | |
| 2003/0185166 A1 | 10/2003 | Belcea | |
| 2004/0098447 A1* | 5/2004 | Verbeke et al. | 709/201 |
| 2004/0143672 A1* | 7/2004 | Padmanabham et al. | 709/231 |
| 2004/0162871 A1* | 8/2004 | Pabla et al. | 709/201 |
| 2004/0255027 A1 | 12/2004 | Vass et al. | |
| 2005/0193099 A1* | 9/2005 | Reus et al. | 709/220 |
| 2005/0203901 A1* | 9/2005 | Waldvogel et al. | 707/5 |
| 2006/0007947 A1 | 1/2006 | Li et al. | |
| 2006/0069800 A1 | 3/2006 | Li | |
| 2006/0168104 A1 | 7/2006 | Shimizu et al. | |
| 2006/0190615 A1 | 8/2006 | Panwar et al. | |
| 2007/0258376 A1* | 11/2007 | Li | 370/238 |
| 2009/0164576 A1* | 6/2009 | Noh et al. | 709/204 |
| 2009/0319824 A1* | 12/2009 | Liu et al. | 714/4 |
| 2010/0067534 A1 | 3/2010 | Shimizu et al. | |
| 2010/0153534 A1* | 6/2010 | O'Neal et al. | 709/223 |

FOREIGN PATENT DOCUMENTS

| | | |
|---|---|---|
| JP | 2006526850 | 1/2006 |
| JP | 2006101277 | 4/2006 |
| JP | JP2006101277 | 4/2006 |
| JP | 2006/238505 | 9/2006 |
| WO | WO 9607257 | 3/1996 |
| WO | WO 0133542 | 5/2001 |
| WO | WO0239620 | 5/2002 |
| WO | WO2003105421 | 12/2003 |
| WO | WO2004110018 | 12/2004 |

OTHER PUBLICATIONS

Cherkasova, L et al: "Fast Replica: Efficient Large File Distribution within Content Delivery Networks", Proceedings of 4th USENIX Symposium on Internet Technologies and Systems. Seattle, Washington, Mar. 26-28, 2003.

Liang, et al: "Hierarchically Clustered P2P Streaming System", IEEE Comm. Society Subject Matter for Expert Publication in the IEEE Globecom Nov. 2007 Proceedings; pp. 236-241.

Kumar et al: "Stochastic Fluid Theory for P2P Streaming Systems," IEEE Comm. Society Subject Matter for Expert Publication in the IEEE Globecom Nov. 2007 Proceedings; pp. 919-927.

Ming et al: "Large-Capacity Media Library Supporting Highly Simultaneous Access," Coden Rexuew Jourtnal of Software, vol. 17, No. 4, Apr. 2006, pp. 915-924.

Jagannathan et al: "Query Protocols for Highly Resilient Perr-to-Peer Networks," Dept. of Computer Science, Purdue Univ., West Lafayette, IN.

Chu et al: "A Case for Taxation in Peer-to-Peer Streaming Broadcast," SIGCOMM '04 Workshops: Aug. 30-Sep. 3, 2004, Portland, Oregon.

Eger et al: "Bandwidth Trading in Unstructured P2P Content Distribution Networkks," Proceedings of 6th IEEE Int'l IEEE Conf on P2P Computing (P2P 06) IEEE 2006.

Ma et al: A Demand & Contribution Based Bandwidth Allocation Mech in P2P Networks. A Game-Theoretic Analysis: Proc. of 20th Int'l Conf on Adv. Info. Netw. & App. (AINA 2006) IEEE 2006.

Tanta-Ngai et al. "A Peer-to-Peer Expressway Over Chord;" Mathematical and Computer Modelling 44, 2006; pp. 659-677.

Huang et al: "Exploring Small World-Like Topologies via Split Probe:" EUC Workshops 2005: LNCS 3823, pp. 724-733, 2005. IFIP International Federation for Inf. Processing 2005.

Ghodsi et al: "Low-Bandwidth Topology Maintenance for Robustness in Structured Overlay Netw.," IMIT-Royal Inst. of Tech., SW. Proc. of Annual HW Int'l Conf on Sys. Sciences 2005.

Hui Wang et al.; "WDM EPON system modeling and simulation based on OPNET," Proc. SPIE 6354, Network Architectures; Management; and Applications IV, 63542Y (Sep. 28, 2006); doi:10.1117/12.687813.

Hai Lui, et al., Architecture design and key technologies for hybrid TDM/WDM optical access networks. (Sep. 2006). In Asia Pacific Optical Communications (pp. 63543A-63543A). International Society for Optics and Photonics.

Shirshanka DAS, et al.; The case for servers in a peer-to-peer world. (Jun. 2006) In Communications, 2006. ICC'06. IEEE International Conference on (vol. 1, pp. 331-336). IEEE.

L. Garces-Erice, et al,, Hierarchical Peer-to-Peer Systems. In Proceedings of ACM/IFIP International Conference on Parallel and Distributed Computing (Euro-Par); Klagenfurt; Austria, 2003.

Satoshi Miyagishima et al. "Dynamic topology reconfiguration in hierarchical P2P system," Multimedia, Distributed, Cooperative and Mobile Symposium (DICOMO 2005) Collection of Papers, Information Processing Society of Japan, vol. 2005, No. 6, pp. 81-84. Jul. 6, 2005—ENG trns to follow.

Nakamura, G. et al, Streaming Playback Control Algorithm of Peer-to-Peer Multicast, IEIC Technical Report (Institute of Electronics, Information and Communication Engineers), 104(690), 307-312.

Kishi, H., et al., "Performance Evaluation of Hierarchical Query Routing in P2P Search Systems," 2003 Joho shori Gakkai Shinpojiumu Ronbunshu, 2003 (18), 243-250.

Taki, Y. et al, "A Construction Method of Streaming Delivery Network wiih Multitree on Application Layer," IEIC Technical Report (Institute of Electronics, Information and Communication Engineers), 103(313), 77-80.

Miyagishirna et al, Dynamic topology reconfiguration in hierarchical P2P system, Multimedia, Distributed, Cooperative and Mobile Symposium (DICOMO 2005) collection of Papers, Information Processing Society of Japan, vol. 2005, No. 6, pp. 81-84, Jul. 6, 2005 (JP orig. prev. submitted).

Kung, H. T., & Wu, C. H. (2001). Hierarchical peer-to-peer networks, Institute of Information Science, Academia Sinica, Taiwan; Tech. Rep. IIS-TR-02-015.

\* cited by examiner

HIERARCHICALLY CLUSTERED P2P STREAMING SYSTEM

PRIORITY CLAIM

This application claims the benefit, under 35 U.S.C. §365 of International Application PCT/US2007/025,656, filed 14 Dec. 2007, which was published in accordance with PCT Article 21(2) on 25 Sep. 2008, in English and which claims the benefit of U.S. provisional patent application No. 60/919,035, filed 20 Mar. 2007 in English.

BACKGROUND OF THE INVENTION

This invention relates to a method for creating a network from technical devices, such as digital electronic consumer devices and/or computers.

In computer technology it is well known to build up a network of connected devices for exchanging data and sharing hardware resources. The separate devices are commonly called nodes. At the time being, nodes are usually computers, but can be other technical devices, such as set top boxes, cellular telephones, mobile electronic devices or the like. The interconnections between the nodes are mainly electrically, optically or wireless radio connections. Networks can be classified as being based on either client-server or peer-to-peer (P2P) architectures. In P2P based networks a node is also referred to as a peer. While in client-server architectures each node is defined to be either client or server, there is no such differentiation in P2P networks. Instead, peers include both, server and client functionalities. P2P technology enables each node to be capable of providing services or resources to any other node in the network, or use services or resources provided by any other node in the network.

P2P networks are usually not restricted to any special applications or underlying network topologies, but can be understood as a set of nodes, or peers, which rely on certain sets of specific protocols. It is characteristic for a P2P network that the peers communicate directly with other peers, so that no central network organization is required. Most P2P networks support that peers can be connected to the network or disconnected from the network at any time.

The mentioned P2P protocols are required for basic network organization, such as for example, discovery of other connected peers, offering own services or resources to other peers (advertising), understanding other peers' advertising messages, or allocating connection capacity for establishing certain connections to other peers. Also, there are protocols that enable a group of peers to cooperate, and thus form a peer-group. Such peer-groups are usually used for providing a common set of services within the peer group. Nevertheless, the purpose of a peer-group is not generally defined. A peer belonging to a peer-group normally has access to, and can be accessed from, all other connected peers of the same group. Additionally, each peer may be a member of further peer-groups. For adding or removing peers to or from a peer group, the user is always required to perform certain administrative activities.

Stochastic Fluid Theory for P2P Streaming Systems (R. Kumar, Y. Liu, and K. Ross, in Proceedings of IEEE INFOCOM, 2007) teaches that the maximum video streaming rate in a P2P streaming system is determined by the video source server's capacity, the number of the peers in the system, and the aggregate uploading capacity of all peers. A perfect scheduling algorithm is also proposed to achieve the maximum streaming rate. In such a scheduling algorithm, each peer uploads the video content obtained directly from the server to all other peers in the system. To guarantee 100% uploading capacity utilization on all peers, different peers download different content from the server and the rate at which a peer downloads content from the server is proportional to its uploading capacity.

A perfect scheduling algorithm achieves the maximum streaming rate allowed by the system. Assuming n peers in the system, and peer i's upload capacity is $u_i$, i=1, 2, ..., n. There is one source in the system with the upload capacity of $u_s$. Denoted by $r^{max}$ the maximum streaming rate allowed by the system is:

$$r^{max} = \min\left\{u_s, \frac{u_s + \sum_{i=1}^{n} u_i}{n}\right\} \quad (1)$$

The value of $$\left(u_s + \sum_{i=1}^{n} u_i\right)/n$$

is the average upload capacity per peer. FIG. 1 illustrates an exemplary system (100) according to the prior art demonstrating how the different portions of data are scheduled among three heterogeneous nodes with perfect scheduling algorithm. There are three peers (120, 130, 140) depicted in the system. Assuming the server (110) has capacity of 6 and the upload capacities of a (130), b (120) and c (130) are 2, 4 and 6 respectively, and that that all peers have enough downloading capacity, the maximum video rate that can be supported in the system is 6. To achieve that rate, the server divides video data into portions of 6 (151, 152, 153). A (130) is responsible for uploading 1 portion out of video data while b (140) and c (120) are responsible for upload 2 and 3 portions within each video data. This way, all peers (130, 140, 120) can download video at the maximum rate of 6. To implement such a perfect scheduling algorithm, each peer needs to maintain a connection and exchange video content with all other peers in the system. In addition, the server needs to split the video stream into multiple sub-streams with different rates, one for each peer. A real P2P streaming system can easily have a few thousand of peers. With current operating systems, it is unrealistic for a regular peer to maintain thousands of concurrent connections. It is also challenging for a server to partition a video stream into thousands of sub-streams in real time. Thus it is desirable to have a P2P streaming system which can achieve the streaming rate close to the theoretical upper bound, and the scheme is practical enough to use in practice.

SUMMARY OF THE INVENTION

In accordance with an aspect of the present invention, an apparatus and method for broadcasting data in a network of nodes is disclosed. The data may comprise video signals, audio signals, both audio and video signals, and forms of data, such as text, auxiliary data, or encoded information. According to an exemplary embodiment, the method for broadcasting a signal comprising the steps of receiving a plurality of requests for said signal from a plurality of peers, determining the number of peers requesting data, organizing said plurality of peers into a plurality of subsets of peers, dividing said signal into a number of portions of said signal equal to the number of subsets of peers, designating a single peer within each subset of peers as a cluster head of said subset of peers, and transmitting a portion of said signal to said cluster head within each subset of peers.

In accordance with another aspect of the present invention, the method for broadcasting a signal further comprises the step of enabling each of the cluster heads to transmit their respective received portion of the signal to each of said other cluster heads, such that each cluster head receives each of the portions of the signal from each of the other cluster heads, thereby enabling each cluster head to generate a recombined signal representative of the signal.

In accordance with another aspect of the present invention, the apparatus comprises an interface for receiving requests for data from a plurality of nodes, a processor for determining the number of nodes requesting data, for organizing said plurality of nodes into a plurality of subsets of nodes, for dividing the data into a number of portions equal to the number of subsets of nodes, and a transmitter for sending a portion of the data to a cluster head of each subset of nodes.

DETAILED DESCRIPTION

Other than the inventive concept, the elements shown in the figures are well known and will not be described in detail. Also, familiarity with television broadcasting and receivers is assumed and is not described in detail herein. A hierarchically clustered P2P streaming scheme (HCPS) to address the scalability issue faced by perfect scheduling algorithm. Instead of forming a single, large mesh, HCPS groups the peers into clusters. The number of peers in a cluster is relatively small so that the perfect scheduling algorithm can be successfully applied at the cluster level. A peer may be a device, cell phone, television signal processing device, radio frequency receiver, computer, thin client, set top box, modem, remote device, bridge device or other like device arranged in a network like structure. One peer in a cluster is selected as the cluster head and works as the source for this cluster. The cluster heads receives the streaming content by joining an upper level cluster in the system hierarchy. A cluster head may be any peer in the cluster, selected upon any criteria determined by system designers. The cluster head may be a device, cell phone, television signal processing device, radio frequency receiver, computer, thin client, set top box, modem, remote device, bridge device or other like device.

Figure 1:
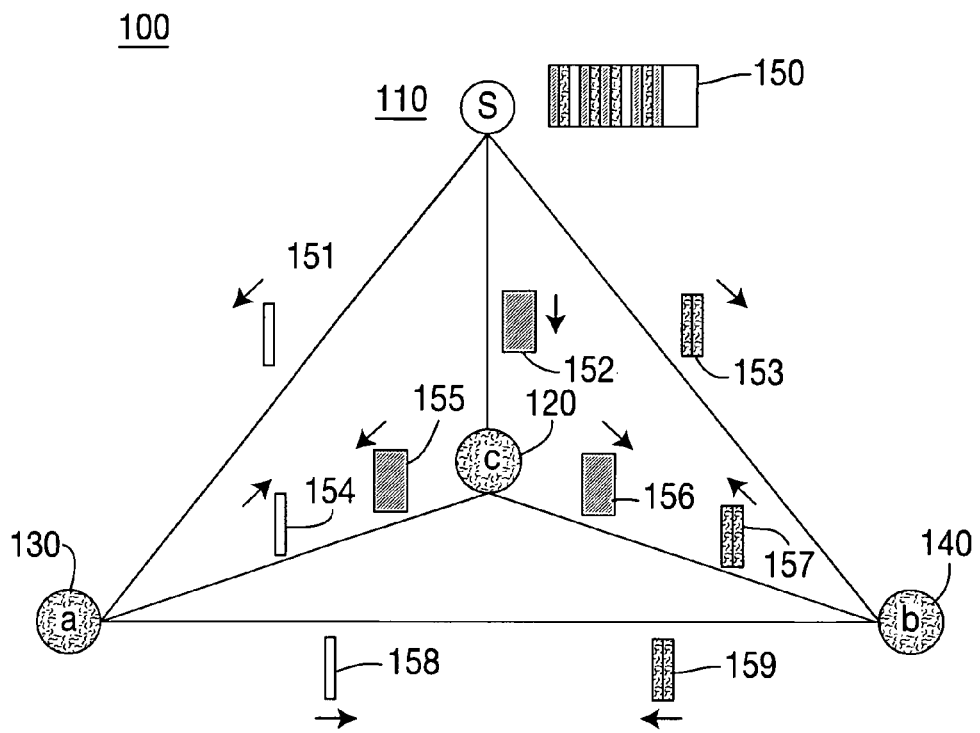
FIG. 1 illustrates an exemplary system (100) according to the prior art depicting a P2P architecture for using a perfect scheduling algorithm.
Figure 2:
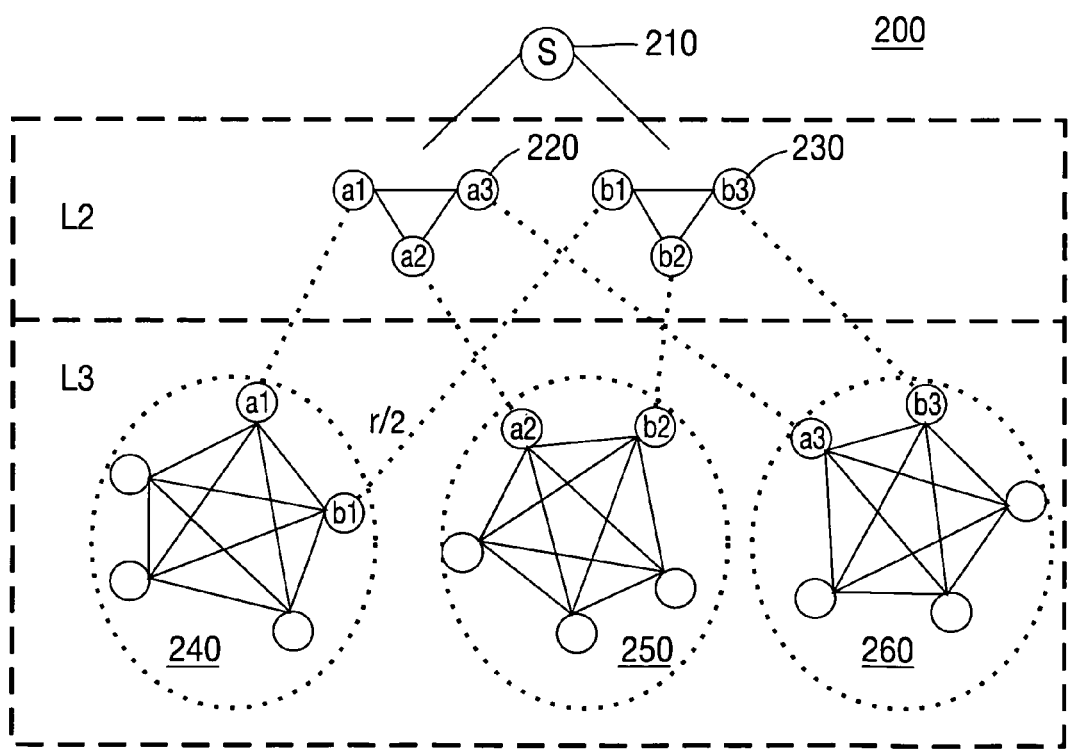
FIG. 2 illustrates a Hierarchically Clustered P2P Streaming System according to the present invention.

Turning to FIG. 2, an exemplary embodiment of a simple example of the proposed system (200) according to the present invention is presented. In the system of FIG. 2, the peers (a1-a3, b1-b3) are organized into a two-level hierarchy (L2, L3). At the base level (L3), peers are grouped into small size subsets of peers, or clusters (240, 250, 260). The peers are fully connected within a cluster. The peer with the largest upload capacity (a1, b1, c1) is elected as the cluster head. At the top level (L2), all cluster heads and the video server forms two clusters (220, 230). Video server (210) distributes the content to all cluster heads (a1, b1, c1) using the perfect scheduling algorithm at the top level (L2). At the base level (L3), each cluster head (a1, b1, c1) acts as the video server in its cluster and distributes the downloaded video to other peers in the same cluster, again, using the perfect scheduling algorithm. The number of connections on each normal peer is bounded by the size of its cluster. Cluster heads (a1, b1, c1) additionally maintain connections in the upper level cluster (L2).

Assuming in an exemplary embodiment that a cluster size is bounded by $N_{max}$, and the source can support up to $N_s$ top layer clusters. The two-layer HCPS system, as shown in FIG. 2, can accommodate up to $N_s(N_{max})^2$ peers. Assuming that $N_s=10$ and $N_{max}=20$, HCPS can support up to 4,000 peer. The maximum number of connections a peer needs to maintain is 40 for cluster head and 20 for normal peer, which is quite manageable. More peers can be accommodated by adding more levels into the hierarchy (vertical expansion).

In designing a system according to the present invention, it is desirable that the peers be clustered such that the supportable streaming rate can be maximized. The maximum streaming rate, $r_{max}$, for a given set of peers and the source is achieved using the perfect scheduling algorithm with fully connected mesh. The mesh constructed in HCPS is not fully connected, which may reduce the maximum supportable streaming rate. It is desirable to have peer clustering strategies that would allow HCPS to support the streaming rate close to $r_{max}$. Heuristic peer clustering strategy that allows HCPS to have good supportable streaming rate.

In order to formulate a desirable supportable streaming rate for a given HCPS mesh topology as an optimization problem, assuming C clusters, N peers, and one source in the HCPS mesh. Cluster c has Vc peers, c=1, 2, ... C. Denote by $u_i$ the peer i's upload capacity. A peer can participate in the HCPS mesh either as a normal peer, or as a cluster head in the upper layer cluster and a normal peer in the base layer cluster. Denote by $u_{ic}$ the amount of upload capacity of peer i contributed to cluster c as a normal peer, and by $h_{ic}$ the amount of upload capacity of peer i contributed to cluster c as a cluster head. We further denote by us the source upload capacity and by $u_c^s$ the amount of source capacity used for a top layer cluster c. If $r_c^{max}$ represents the maximum streaming rate for cluster c using perfect scheduling algorithm, the maximum supportable streaming rate for a given cluster-based HCPS mesh, $r^{HCPS}$, can be formulated as following optimization problem.

$$r^{HCPS} = \max_{\{u_{ic}, h_{ic}, u_c^s\}} \{\min[r_c^{max} \mid c = 1, 2, \ldots, C]\} \quad (2)$$

Subject to:

$$r_c^{max} = \min\left\{\frac{\sum_{i=1}^{N}(u_{ic} + h_{ic})}{V_c}, \sum_{i=1}^{N} h_{ic} + u_c^s\right\} \quad (3)$$

$$\sum_{c=1}^{C} u_{ic} + h_{ic} \leq u_i \quad (4)$$

$$\sum_{c=1}^{C} u_c^s \leq u^s \quad (5)$$

where Eqn. (3) is true for all c, c=1, 2, ..., C, and Eqn. (4) is true all for i, i=1, 2, ..., N. $u_{ic}=0$ if peer i is not in cluster c; and $h_{ic}=0$ if peer i is not cluster c's head.

The maximum supportable streaming rate for a given mesh topology is the streaming rate that can be supported by all clusters. Since the cluster head participates in both upper layer and lower layer clusters and the source's upload capacity is used by several top layer clusters, the supportable streaming rate for HCPS can be maximized by adjusting the allocation of clusters' upload capacity and source's upload capacity. (equation 2) The first term in Equation (3) represents the average upload capacity per peer; and the second term represents the cluster head's upload capacity (cluster head can be the source or a peer). Since the maximum value of streaming rate at cluster c, $r_c^{max}$ is governed by the perfect scheduling algorithm, this leads to the Equation (3). Further, the amount of bandwidth of cluster heads allocated for the upper layer and low layer clusters must not surpass its total upload capacity. (equation 4) Finally, for the source, the total allocated upload capacity for all clusters must not surpass the source's total upload capacity. (equation 5).

It is desirable in a HCPS mesh topology to support a streaming rate close to the optimal rate $r_{max}$. Assuming there are 400 peers with one source node, the cluster size is 20, and the peers are grouped into 20 base layer clusters and one top layer cluster for cluster heads. The maximum supportable streaming rate for HCPS is computed according to the optimization problem as formulate in Equation (2).

According to Equation (2), the maximum supportable streaming rate, $r_{HCPS}$, takes the minimum cluster streaming rate among all clusters. The cluster streaming rate (equation 3) is the minimum of cluster average upload capacity and the cluster head's rate. The peers should be divided into clusters with similar average upload capacity to avoid wasting resources. The discrepancy of individual clusters' average upload capacity per peer should be minimized. The cluster head's upload capacity should be as large as possible. The cluster head's capacity allocated for the base layer capacity has to be larger than the average upload capacity to avoid being the bottleneck. Furthermore, the cluster head also joins the upper layer cluster. Ideally, the cluster head's rate should be greater than or equal to $2r_{HCPS}$.

It is desirable that the number of peers in a cluster should be bounded from the above by a relative small number. The number of peers in a cluster determines the out-degree of peers, and a large size cluster prohibits a cluster from performing properly using perfect scheduling.

Due to the peer dynamics, i.e., the peers join and leave the system all the time, the HCPS mesh should be dynamically adjusted to have consistent high supportable streaming rate. HCPS system has a bootstrap node that has the knowledge of the entire network: peers in the system, their upload capacities, the mesh topology (the membership of a cluster and its cluster head), etc. Bootstrap node also runs an optimizer that solves the optimization problem as formulated in Equation (2). Meanwhile, the cluster head manages the cluster it belongs to. Its responsibility includes (i) executing perfect scheduling algorithm locally based on member peers' upload capacities and the amount of upload capacity allocated as cluster head; (ii) handling the local peer departures and crashes; (iii) handling the instructions from the bootstrap node. The instructions includes new peer joining the cluster, cluster merge, cluster split, and cluster head change; (iv) maintaining the communication with the bootstrap node. Periodically update the bootstrap node about the membership of the cluster.

Figure 3:
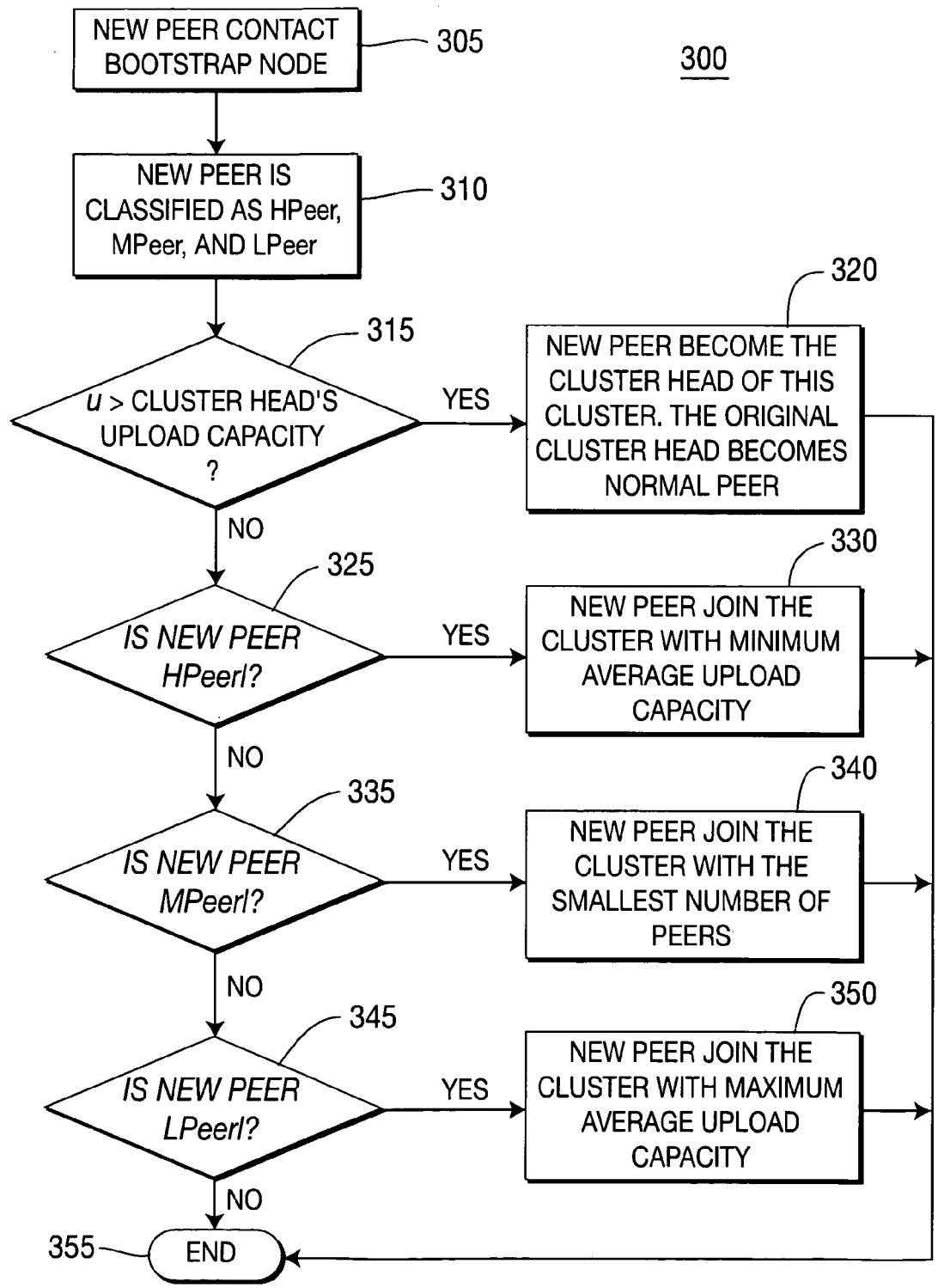
FIG. 3 illustrates an exemplary embodiment teaching a method of handling a new peer join according to the present invention.
Figure 4:
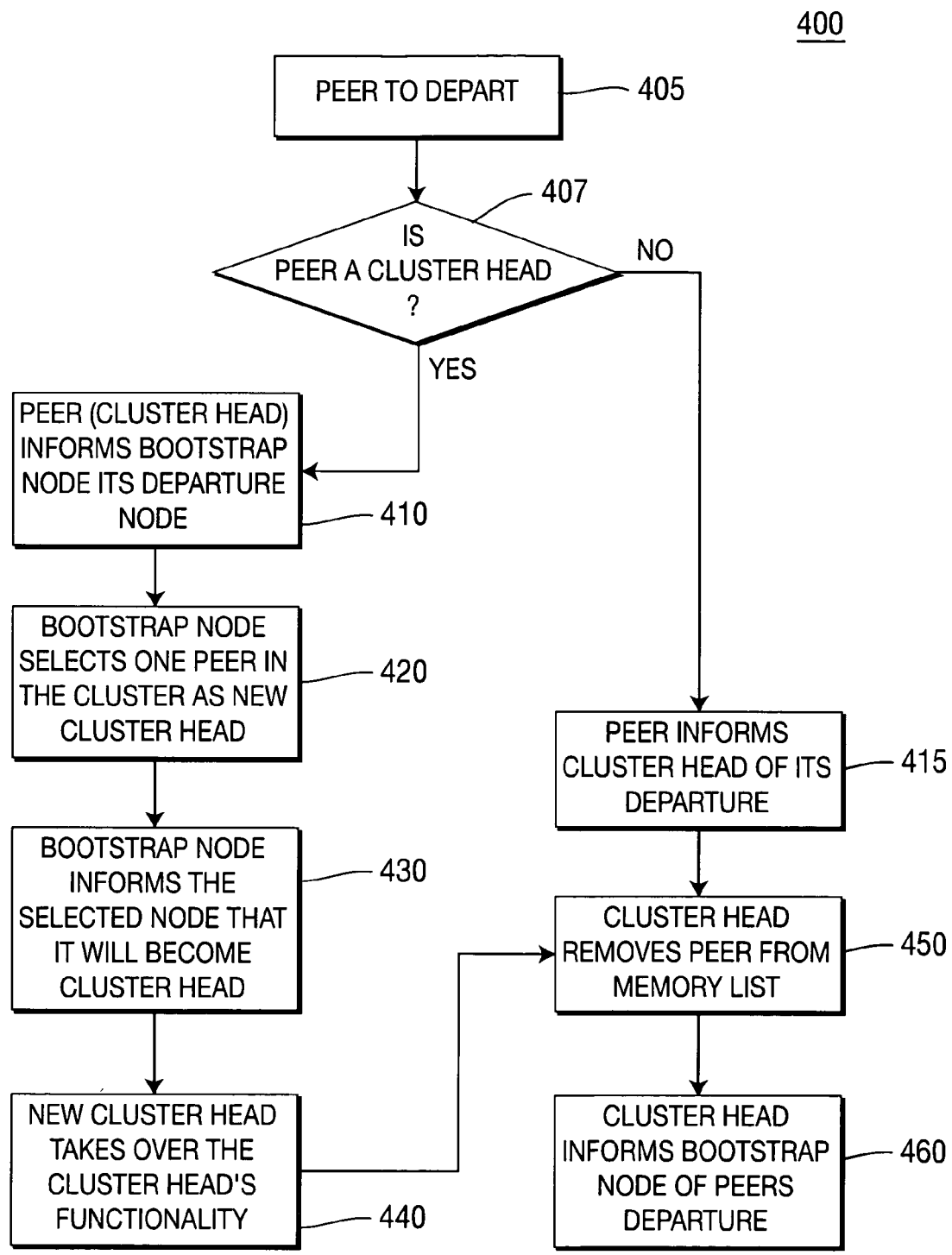
FIG. 4 illustrates an exemplary embodiment teaching a method of handling a peer departure according to the present invention.
Figure 5:
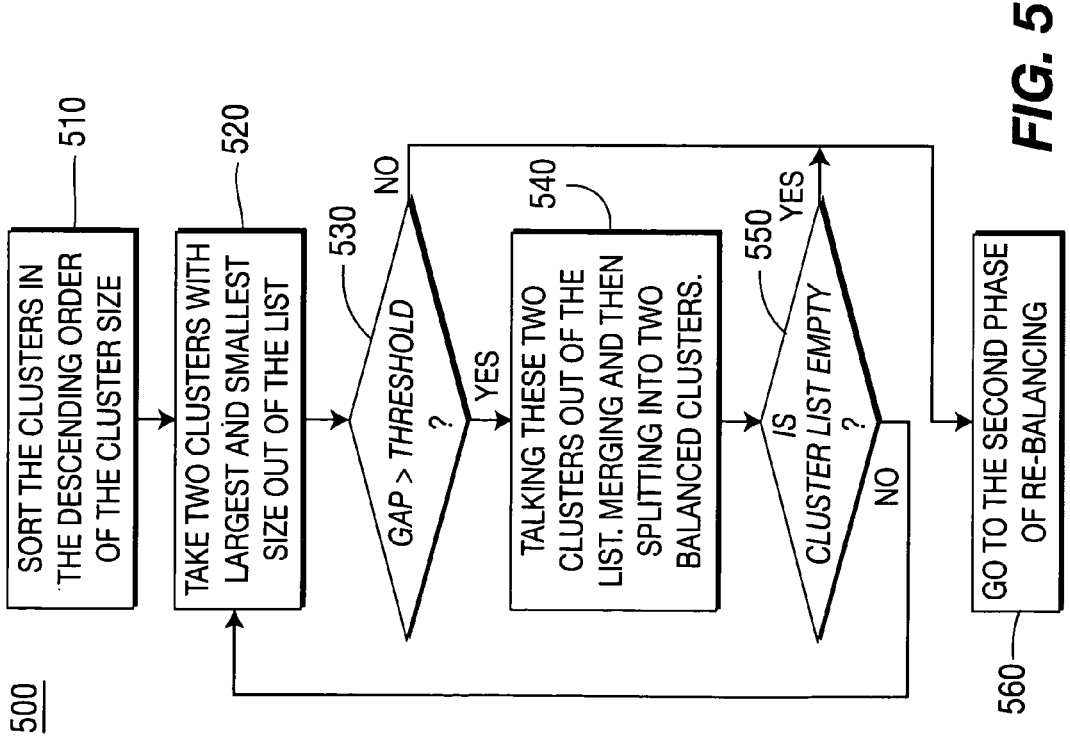
FIG. 5 illustrates an exemplary embodiment of the first phase of cluster re-balancing according to the present invention.

FIG. 3-FIG. 5 describe the handling of new peer join, peer departure, and cluster re-balancing operation, respectively.

Turning to FIG. 3, an exemplary embodiment teaching a method of handling a new peer join is shown (300). The new arrival contacts the bootstrap node first (305). Based on the peer's upload capacity, u, and the current supportable streaming rate, $r^{HCPS}$, the peer is classified (310). The peer is classified as HPeer (with large upload capacity) if $u \geq r^{HCPS} + \delta$, MPeer (with medium upload capacity) if $r^{HCPS} - \delta < u < r^{HCPS} + \delta$, and LPeer (with small upload capacity) otherwise. All clusters whose number of peers is no greater than Nmax are eligible to accept the new peer, where Nmax is the maximum number of nodes allowed by a cluster.

If the upload capacity of the new peer, u, is greater than some eligible cluster heads' upload capacity by a margin (315), the peer is assigned to the cluster with the smallest cluster head upload capacity. The new peer is to replace the original cluster head, and the original head becomes the normal peer and stay in the cluster (320).

The bootstrap node redirects the new peer to the cluster head, and informs the cluster head that the new peer will replace it. The cluster head transfer the membership info to the new peer, and un-register itself from the upper layer cluster. The original cluster head becomes a normal peer from now on. The new peer assumes the role of cluster head by registering itself into the upper layer cluster, and inform peers in the cluster where it is the new head. The new head executes the perfect scheduling algorithm and runs the cluster. Note that the value of the margin is typically a configuration parameter. Since the overhead of cluster head change is heavy, typically the margin is set to be a relatively large value.

If the new peer does not replace any cluster head, it is assigned to a cluster according to the value of u and the average upload capacity in the cluster. In an exemplary embodiment of cluster assignment among peers, the peer is assigned to the cluster with the minimum average upload capacity (330) if the peer is HPeer (325); the peer is assigned to the cluster with the smallest number of peers (340) if it is MPeer (335); and the peer is assigned to the cluster with maximum average upload capacity (350) if it is LPeer (345). This distribution is to balance the upload resources among clusters. The new peer is redirected to the corresponding cluster head, and bootstrap node requests the cluster head to admit the new peer. The cluster head takes the new peer, and informs other peers in the cluster. The connections are set up between new peer and other peers, and the cluster head adjusts the transmitting rate by applying perfect scheduling. In case all clusters are full and cannot accept a new peer, the bootstrap node randomly selects one cluster and split it into two clusters.

Turning to FIG. 4, an exemplary embodiment teaching a method of handling a peer departure is shown (400). When a peer decides to depart (405), if the peer is a normal peer (407), it informs the cluster head of its departure (415). The cluster head take the peer off its cluster member list, and informs other peers its departure (450). The cluster head then re-calculates the sending rate to other peers based on perfect scheduling. The cluster head also informs the bootstrap node the peer's departure (460).

In case the departing peer is the cluster head (407), the peer informs the bootstrap node its departure (410). The bootstrap node selects one peer from existing peers in the cluster as the new cluster head (420). The bootstrap node then informs the selected node that it will be the cluster head (430). The new cluster head then takes over the cluster head's functionality (440). The new cluster head then takes the old cluster head off its cluster member list, and inform other peers its departure (450). The new cluster head then re-calculates the sending rate to other peers based on perfect scheduling. Cluster head also informs the bootstrap node the peer's departure (460).

If a peer is crashed, the handling is the same for the normal peer. The cluster head notices the peer's crash, and treats it the same way as a normal departure. If the cluster head crashes, a peer in the cluster can inform the bootstrap node. The bootstrap node selects the peer with largest upload capacity as the new cluster head. The bootstrap node behaves as the cluster head, and let the selected peer to replace itself to become the new cluster head.

The clusters may lose balance in terms of the number of peers and the amount of resources in a cluster as the result of peer dynamics. Turning to FIG. 5, the first phase of cluster re-balancing is shown. In HCPS, the bootstrap node periodically attempts to re-balance the clusters. At the end of an epoch, the bootstrap node first attempts to balance the cluster sizes. The clusters are sorted in the descending order of cluster size (510). If the gap between the clusters with the largest and the smallest number of peers (520) is greater than threshold=$\max\{\alpha N^{max}, \beta \overline{N}\}$, where $\overline{N}$ is the average cluster size (530), these two clusters will be merged and then split into two balanced clusters (540). The merge and split operation are described below, respectively. The above process continues until no clusters violate the condition (550). The process then commences the second phase of re-balancing (560) as further depicted in FIG. 6.

Figure 6:
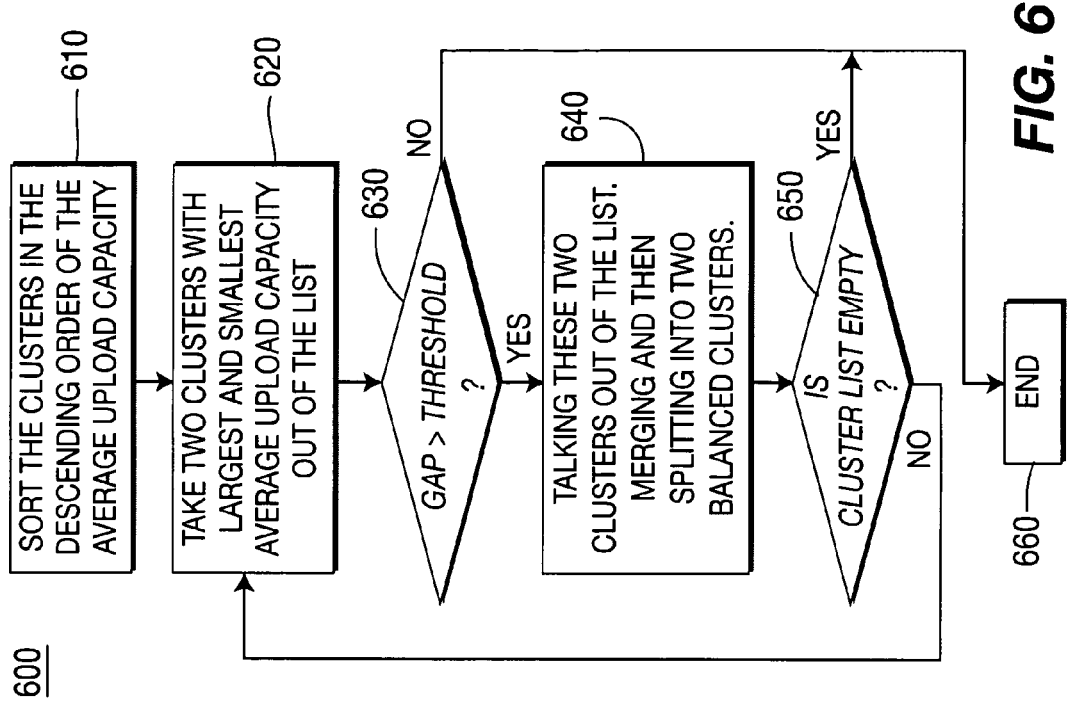
FIG. 6 illustrates an exemplary embodiment of the second phase of re-balancing according to the present invention.

Turning now to FIG. 6, the second phase of re-balancing is shown (600). In the second phase of cluster re-balancing, the bootstrap node attempts to balance the resources. The clusters are sorted in the descending order of average upload capacity per peer (610). If the average upload capacity difference of the clusters with highest and lowest upload capacity (620) is greater than the threshold of $\theta \overline{u}$, where $\overline{u}$ is the system average upload capacity (630), these two clusters will be merged and then split into two balanced clusters (640).

Figure 7:
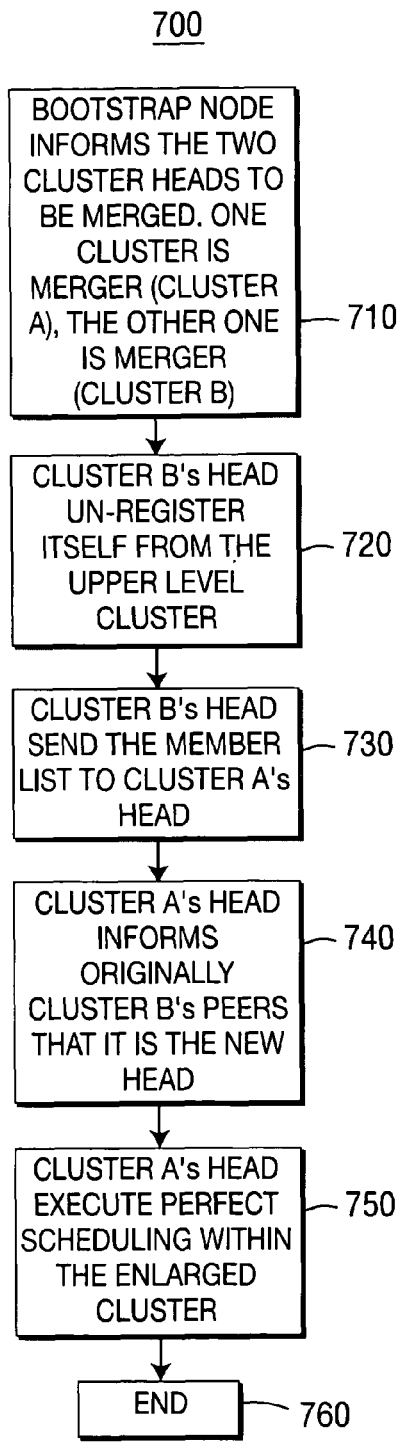
FIG. 7 illustrates an exemplary embodiment of the cluster merge process according to the present invention.

Turning now to FIG. 7, the cluster merge process is shown (700). The bootstrap node informs the two cluster heads the decision of merge and indicate which cluster is to be merged (710). The merged cluster head un-registers itself from upper layer cluster (720), and sends the member list to the new cluster head (730). The new cluster head informs all peers in the new cluster the member list (740). Connections are set up among peers. The new cluster head also re-calculates the sending rate using perfect scheduling. The new cluster head executes the perfect scheduling within the enlarged cluster (750).

Figure 8:
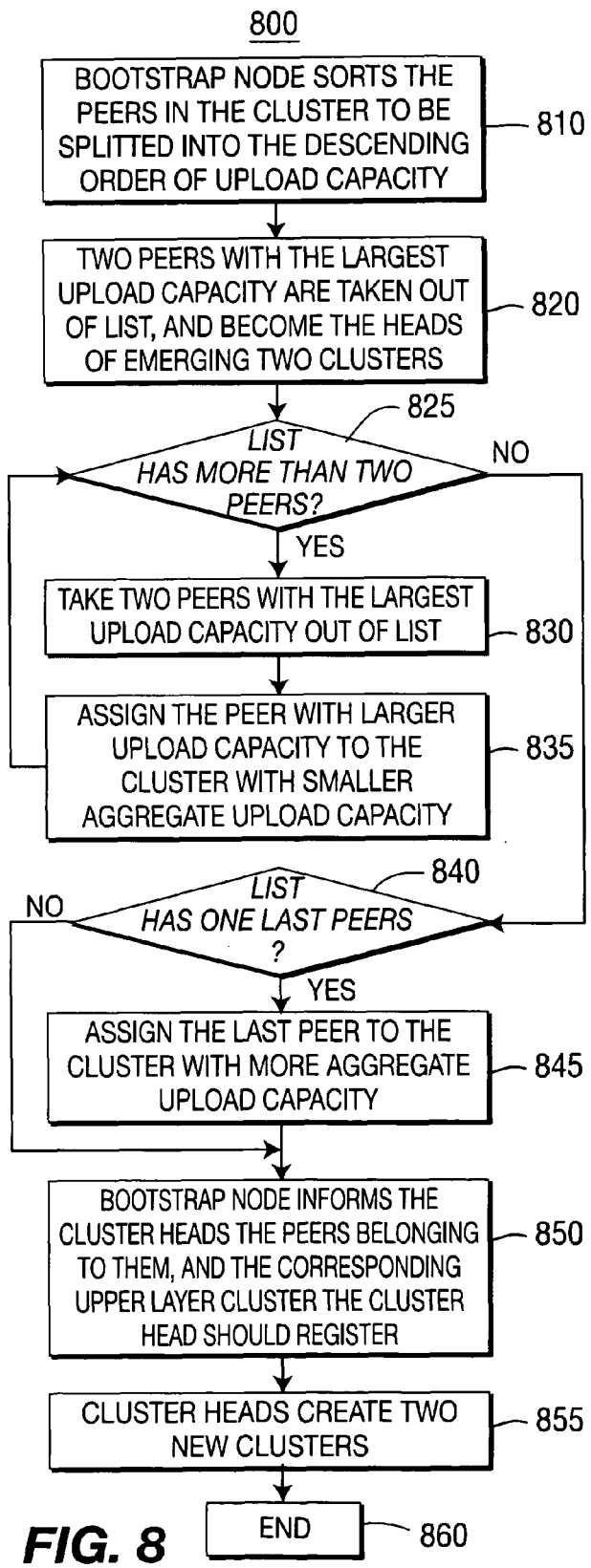
FIG. 8 illustrates an exemplary embodiment of the cluster split process according to the present invention.

Turning now to FIG. 8, the cluster split process is shown (800). The goal of cluster split is to divide the peers into two clusters that have roughly the similar number of peers and similar average upload capacity per peer. The bootstrap node manages the entire process. The cluster head sorts the peers in the descending order of upload capacity. (810) The peer with the largest upload capacity becomes the cluster head of the emerging new cluster (820). In the following rounds, two peers at the top of sorted list are taken out of the list. (830) The one with the larger upload capacity is assigned to the cluster with smaller aggregate upload capacity (835) and the peer with smaller upload capacity is assigned to the cluster with larger aggregate upload capacity. The process continues until all peers are assigned (825). If there is only one peer in the last round (840), then the peer is assigned to the cluster with more aggregate upload capacity (845).

Once the cluster membership is decided, the new cluster head creates the new cluster (850). It registers itself into the upper layer cluster, and then broadcasts the member list to all peers (855). The cluster head computes the sending rate to each peer using the perfect scheduling (860). The original cluster head also informs the peers remaining in the cluster of the new member list, and computes the new sending rate.

Dynamic peer management enables the HCPS to have self-adaptive ability to balance member clusters in order to achieve high streaming rate, which makes HCPS desirable in relation to other P2P streaming systems. Assuming, for example, that one node i needs to spend ts transmission delay to deliver one specified data segment to other peer, then by perfect scheduling algorithm the last peer in the top level to receive the data chunk will wait tp+Nmax*ts time, where tp is the propagation delay from the server to node i. Given the designed small number Nmax and conventional propagation and transmission delay, the delay in one cluster can be quite small. To the two-level HCPS system, the data chunk will encounter at most two such above processes to reach all the peers of the system, because the process for the normal peer in the base level fetching data from cluster head is similar as that of head fetching data from server.

Figure 9:
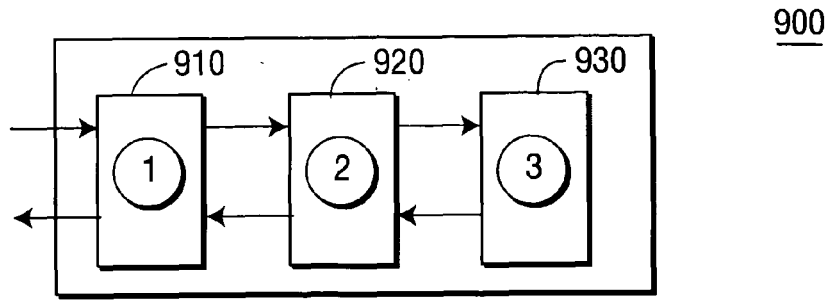
FIG. 9 illustrates an exemplary embodiment of the architecture of bootstrap node according to the present invention.

Turning now to FIG. 9, the architecture of bootstrap node is shown (900). The bootstrap node has three key components (910-930). Communication interface component is responsible to handle the incoming/outgoing signaling between the peers and bootstrap node. Coordinating component executes the key algorithms. These algorithms include cluster re-balancing algorithm, peer join, peer departure, peer merge, peer split, etc. based on the description before. It uses the peer related info and cluster related information stored in the component 3 (930). It may also update the component 3 (930) based on the incoming signaling information. Component 3 (930) is a database that keeps track of peer related information and cluster related information. This information includes, but not limited to, the peer IP address, the peer upload capacity, if a peer is cluster head, which cluster the peer joins, etc.

The architecture of a peer node (not shown) is similar to that of a bootstrap node. A peer also has three components. A communication interface component is responsible to handle the communication signaling with other peers and bootstrap node. Coordinating component executes the key algorithms. If the peer is cluster head, it execute the perfect scheduling algorithm, and handles member peers arrival, departure/crash, cluster merge and split with other cluster, etc. If the peer is a normal peer, it contacts the cluster head and bootstrap node to update its information. It also receives the instruction from cluster head and bootstrap node to replace other cluster head. Cluster related information database stores the information of the peers belonging to the same cluster.

Figure 10:
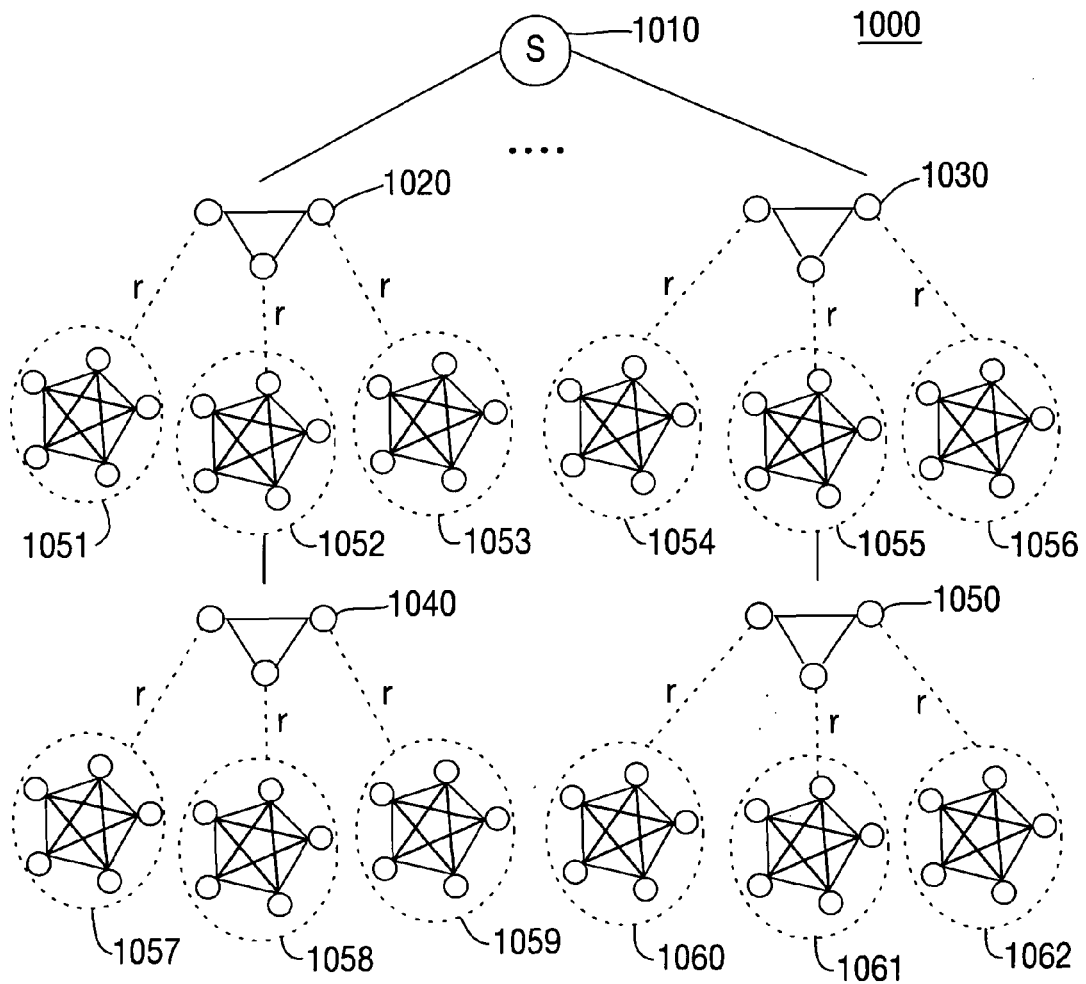
FIG. 10 illustrates an exemplary embodiment of vertical expansion of an HCPS system according to the present invention.

Turning to FIG. 10, an exemplary embodiment of vertical expansion of an HCPS system is shown (1000). HCPS is capable of supporting a larger number of peers with two-level structure than other signal level P2P streaming systems. The vertically expanded system comprises a first video server (1010) and a first level of sources (1020, 1030) for the second level clusters (1051-1056). The number of peers can be further increased by adding additional levels, hereinafter called vertical expansion. A peer in the second-level cluster (1051-1056) can drive another two-level HCPS system as the video server. Of course the peer that heads the next two-level clusters (1040, 1050) need to have sufficient upload capacity to contribute in the current cluster, and contribute as the source to low-level clusters (1057-1062). With the vertical expansion, the number of peers increases exponentially as the level of the system increases.

The invention claimed is:

1. A method, comprising the steps of:
    receiving a plurality of requests for a signal from a plurality of devices;
    organizing said plurality of devices into a plurality of subsets of devices, said plurality of subsets of devices being arranged as a first plurality of clusters of peers in a base hierarchical level and a second plurality of clusters of peers in an upper hierarchical level, each one of said first plurality of clusters of peers exhibiting a mesh topology, all peers within said each one of said first plurality of clusters of peers being fully connected to one another;

dividing said signal into a number of portions of said signal equal to the number of subsets of devices;

designating a single device having the largest upload capacity among the devices within each one of said first plurality of clusters of peers as a cluster head of said each one of said first plurality of clusters of peers, a plurality of said cluster heads forming said second plurality of clusters of peers in said upper hierarchical level, said second plurality of clusters of peers receiving said signal from a server;

providing a portion of said signal to each one of said cluster heads;

enabling each one of said cluster heads to provide a received portion of said alto each one of the other cluster heads such that said each one of said cluster heads receives each of said portions of said signal from each of said other cluster heads thereby enabling said each one of said cluster heads generates a recombined signal representative of said signal; and enabling each one of normal peers within said first plurality of clusters of peers to provide a received part of said recombined representation of said signal to each one of the other normal peers within each one of said first plurality of clusters of peers, such that said each one of the other normal peers receives each one of said parts of said recombined representation of said signal from each one of the other normal peers within each one of said first plurality of clusters of peers, thereby enabling each one of the other normal peers within said each one of said first plurality of clusters of peers to generate a dataset representative of said recombined signal representative of said signal.

2. The method according to claim 1 further including the step of
allocating to at least one of said cluster heads an upload capacity larger than an average upload capacity of the cluster of peers represented by said cluster head.

3. The method according to claim 1 further comprising the steps of:
receiving a request to add an additional device to said plurality of devices;
classifying said additional device in response to an upload capacity of said additional device; and
assigning said additional device to one of said first plurality of clusters of peers in response to an average upload capacity of said one of said first plurality of clusters of peers.

4. The method according to claim 1 further comprising the steps of:
receiving a request to remove a departing device from said plurality of devices;
determining whether said departing device is one of said cluster heads;
removing said device from one of said first clusters of peers to which said departing device belongs; and
designating another device within said one of said first clusters of peers to which said departing device belongs as a new cluster head in response to said departing device being a cluster head.

5. An apparatus comprising:
a first interface for receiving a plurality of requests for a signal from a plurality of devices;
a processor operative to enable to organize said plurality of devices into a plurality of subsets of devices, said plurality of subsets of devices being arranged as a first plurality of clusters of peers in a base hierarchical level and a second plurality of clusters of peers in an upper hierarchical level, each one of said first plurality of clusters of peers exhibiting a mesh topology, all peers within said each one of said first plurality of clusters of peers being fully connected to one another,
operative to enable to divide said signal into a number of portions of said signal equal to the number of subsets of devices,
operative to enable to designate a single device having the largest upload capacity among the devices within each one of said first plurality of clusters of peers as a cluster head of said each one of said first plurality of clusters of peers, a plurality of said cluster heads forming said second plurality of clusters of peers in said upper hierarchical level, said second plurality of clusters of peers receiving said signal from a server;
a second interface for transmitting a portion of said signal to each one of said cluster heads;
said processor operative to enable each one of said cluster heads to provide a received portion of said signal to each one of the other cluster heads, such that said each one of said cluster heads receives each of said portions of said signal from each of said other cluster heads thereby enabling said each one of said cluster heads to generate a recombined signal representative of said signal; and
said processor operative to enable each one of normal peers within said first plurality of clusters of peers to provide a received part of said recombined representation of said signal to each one of the other normal peers within each one of said first plurality of clusters of seers such that said each one of the other normal leers receives each one of said parts of said recombined representation of said signal each one of the other normal peers within each one of said first plurality of clusters of peers, thereby enabling each one of the other normal peers within said each one of said first plurality of clusters of peer to generate a dataset representative of said recombined signal representative of said signal.

6. The apparatus according to claim 5 wherein
said processor is further operative to enable to allocate to at least one of said cluster heads an upload capacity larger than an average upload capacity of the cluster of peers represented by said one of said cluster heads.

7. The apparatus according to claim 5 wherein
said processor is further operative to enable to receive a request to add an additional device to said plurality of devices,
operative to enable to classify said additional device in response to an upload capacity of said additional device, and
operative to enable to assign said additional device to one of said first plurality of clusters of peers in response to an average upload capacity of said one of said first plurality of clusters of peers.

8. The apparatus according to claim 5 wherein
said processor is further operative to enable to receive a request to remove a departing device from said plurality of devices,
operative to enable to determine whether said departing device is one of said cluster heads, operative to enable to remove said departing device from one of said first clusters of peers to which said departing device belongs, and operative to enable to designate another device within said one of said first clusters of peers to which said departing device belong as a new cluster head in response to said departing device being a cluster head.

* * * * *